UNITED STATES PATENT OFFICE.

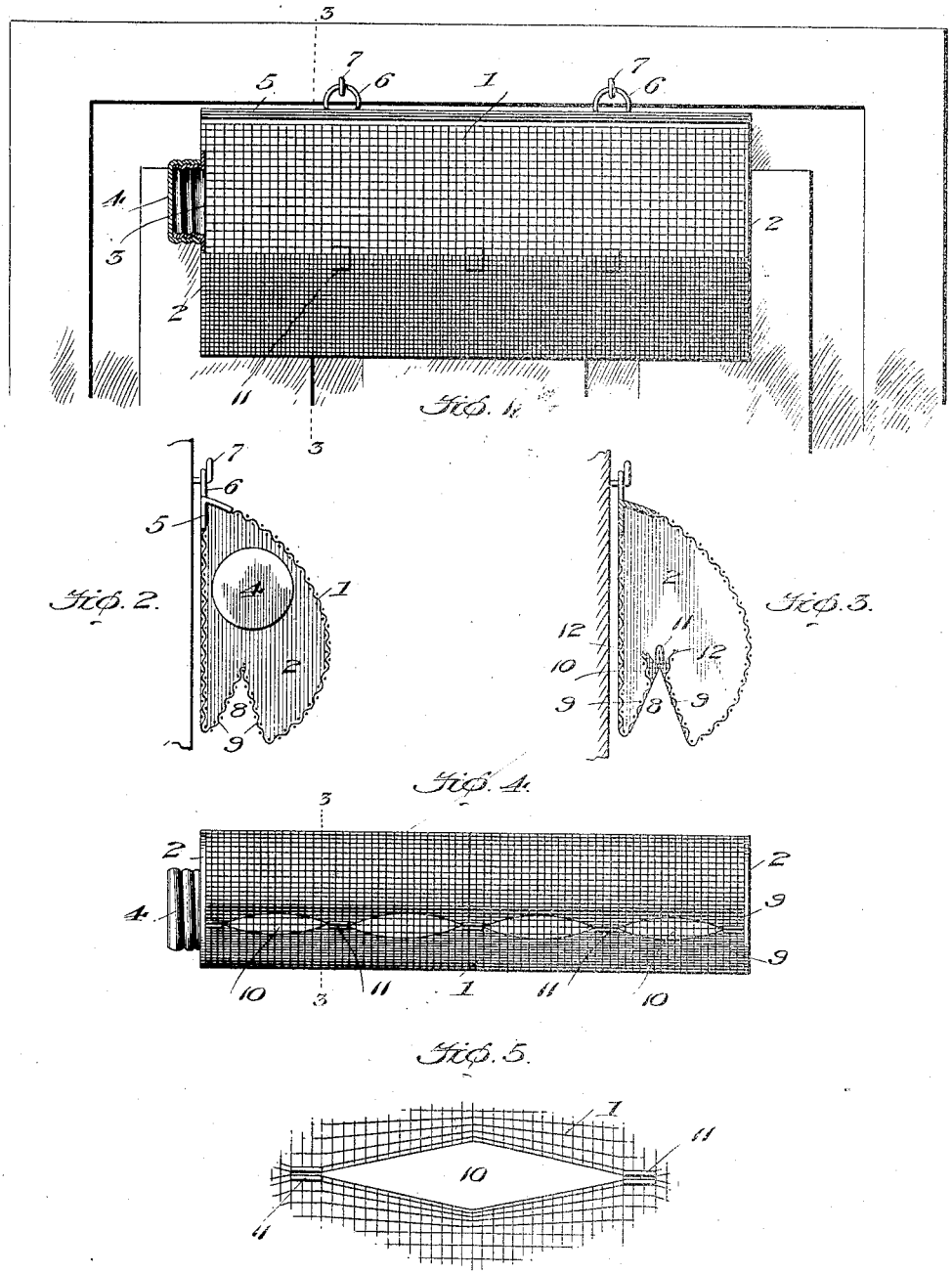

DELBERT H. REDDEN AND JOHN F. CUNNINGHAM, OF PARK CITY, UTAH, ASSIGNORS OF ONE-FOURTH TO EDWARD P. LE COMPTE AND ONE-FOURTH TO WILLIAM DOIDGE, OF PARK CITY, UTAH.

FLY-TRAP.

971,404.  Specification of Letters Patent.  Patented Sept. 27, 1910.

Application filed June 4, 1909. Serial No. 500,208.

*To all whom it may concern:*

Be it known that we, DELBERT H. REDDEN and JOHN F. CUNNINGHAM, citizens of the United States, residing at Park City, in the county of Summit and State of Utah, have invented certain new and useful Improvements in Fly-Traps, of which the following is a specification.

Our invention relates to fly traps.

The present invention has for its object the provision of a simple, cheap and durable fly trap which can be placed in any suitable location, being preferably hung from a window fly-screen, screen door or the like, which will possess novel features of construction, whereby the flies will naturally walk into the trap, but will be prevented from escaping therefrom and which will be adapted for the easy removal of the flies when a sufficient number have entered the trap.

In carrying out the invention, we provide a trap, preferably of wire screening, having a novel form of entrance, whereby the natural tendency of the fly is to enter the trap, especially when the trap is hung with the entrance lowermost on a fly-screen door or window screen or other place where flies are liable to crawl upwardly, and, further, to provide an opening having a closure by which the flies may be let out of the trap after the trap has been removed for that purpose.

The invention is set forth fully in detail hereinafter and its novel features are recited in the appended claim.

In the accompanying drawings:—Figure 1 is a front elevation showing the trap hung adjacent a door; Fig. 2, an end elevation; Fig. 3, a section on line 3—3 of Figs. 1 and 4; Fig. 4, an edge view of the trap showing the inclined guides and the entrances; Fig. 5, a detail of one of the entrances; and Fig. 6, a detail of one of the clips at the ends of the entrances.

The trap is preferably formed of screening or wire gauze 1 having ends 2 which may be of sheet metal to stiffen the body, the edges of the screening or gauze being secured to the ends in any preferred manner. One of the ends is provided with an outlet 3 closed by a removable screw-cap 4, which affords means whereby the flies may be let out of the trap when desired. The trap is of general semi-cylindrical shape, being provided with a metal reinforcing strip 5 where its rounded face joins its flat face, said strip being provided with rings 6, whereby the trap may be hung from any suitable hooks or supports 7 in the desired position, as for instance, at the top of a screen door, window fly-screen, or the like. When hung in this position, the flat side of the body is disposed vertically substantially against the object from which the trap is hung. In order that the flies may naturally enter the trap when it is positioned as indicated, we provide a guide entrance 8 having inclined converging sides 9 which form an entrant guide, as it were, leading to the entrances 10, of which there may be employed as many as found desirable. The entrances 10 are formed by connecting together, at intervals, the innermost edges of the sides 9 by metal clips 11 of the form shown in Fig. 6, the intermediate parts of the sides 9 being spread or expanded, as shown in Fig. 5, to form the actual inlets by which the flies gain access to the interior of the trap. The entrances 10 are guarded to prevent the outward passage of the flies by turning back the extremities 12 of the walls or sides 9 where they form the entrances 10, as shown in Fig. 3.

Flies naturally crawl upward on a wall, screen door, window, window fly-screen, etc., and hence their natural tendency is to walk into the guide 8, along the walls 9 thereof and to pass through the entrances 10 into the interior of the trap. Once they get inside the trap, they cannot come out again, because the entrances 10 are guarded by the parts 12. When the trap has been filled, it may be removed and the flies destroyed.

Having thus described our invention, what we claim as new and desire to secure by Letters Patent, is:—

A fly-trap closed at its top, ends, back and front, and having a bottom formed by longitudinal lapped portions inclined upward and inward from its back and front and terminating in straight edges, and clips arranged at intervals along said meeting edges of the longitudinal inclined portions; the meeting edges of said longitudinal inclined portions being spread apart between the clips to form guards, for the purpose set forth.

In testimony whereof we affix our signatures in presence of two witnesses.

DELBERT H. REDDEN.
JOHN F. CUNNINGHAM.

Witnesses:
L. B. WIGHT,
BATT MCCARTHY.